United States Patent
Teggatz et al.

(12) 
(10) Patent No.: US 6,678,829 B1
(45) Date of Patent: Jan. 13, 2004

(54) SYSTEM AND METHOD OF REGULATING THE DISTRIBUTION OF POWER THROUGHOUT A SYSTEM THROUGH THE USE OF UNI-DIRECTIONAL AND BI-DIRECTIONAL SWITCHES

(75) Inventors: Ross E. Teggatz, McKinney, TX (US); David J. Baldwin, Allen, TX (US); Sanmukh M. Patel, Addison, TX (US); Juan F. Alvarez, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 593 days.

(21) Appl. No.: 09/596,451

(22) Filed: Jun. 19, 2000

(51) Int. Cl.⁷ .................................................. G06F 1/28
(52) U.S. Cl. ...................................... 713/300; 361/103
(58) Field of Search .......................... 713/300; 710/300, 710/313; 361/103; 327/74

(56) References Cited

U.S. PATENT DOCUMENTS

| | | | | |
|---|---|---|---|---|
| 4,742,441 A | * | 5/1988 | Akerson ........................ | 363/97 |
| 5,099,302 A | * | 3/1992 | Pavlin .......................... | 257/337 |
| 5,349,242 A | * | 9/1994 | Tanaka et al. ............... | 327/427 |
| 5,842,027 A | * | 11/1998 | Oprescu et al. ............. | 713/300 |
| 6,021,076 A | * | 2/2000 | Woo et al. .................... | 365/211 |
| 6,084,790 A | * | 7/2000 | Wong ........................... | 363/71 |
| 6,222,716 B1 | * | 4/2001 | Chiang et al. ............... | 361/103 |
| 6,421,243 B1 | * | 7/2002 | Ives et al. .................... | 361/725 |
| 6,421,261 B1 | * | 7/2002 | Fujisawa et al. ............. | 363/127 |

FOREIGN PATENT DOCUMENTS

JP      05274061 A  * 10/1993 .......... G06F/01/18

OTHER PUBLICATIONS

Wen–Tai et al., Level Shifters for High–Speed 1–V to 3.3–V Interfaces in a 0.13–um Cu–Interconnection/Low–k CMOS Technology, 2001, pp. 307–310.*
Kazuhisa et al, A 5 to 130V Level Shifter Composed of Thin Gate Oxide Dual Thermal Drain PMOSFETs, 1997,pp. 345–348.*

* cited by examiner

Primary Examiner—Thomas Lee
Assistant Examiner—Mark Connolly
(74) Attorney, Agent, or Firm—J. Dennis Moore; W. James Brady, III; Frederick J. Telecky, Jr.

(57) ABSTRACT

An integrated solution to power management and distribution on a power bus, such as needed for an IEEE 1394 compliant expansion board. The integrated circuit includes a uni-directional switch on the input and one or more bi-directional switches on one or more outputs. Current can flow from the system power supply to any connected peripherals via the uni-directional switch and bi-directional switches, or can flow from the peripheral having the highest voltage power supply to the other peripherals via the bi-directional switches, but current will not flow back to the main system because of the unidirectional switch connected to the system power supply. Over-current conditions are quickly detected and the bi-directional switch is opened to prevent damage or over-heating. The switches are preferably fabricated as power FETs using NMOS technology. Several integrated circuits can be cascaded together to accommodate multiple peripherals.

19 Claims, 6 Drawing Sheets

SYSTEM AND METHOD OF REGULATING THE DISTRIBUTION OF POWER THROUGHOUT A SYSTEM THROUGH THE USE OF UNI-DIRECTIONAL AND BI-DIRECTIONAL SWITCHES

FIELD OF THE INVENTION

This invention relates generally to power distribution and management for electronic devices and more particularly to an integrated switch and fuse that allows for adaptive selection of a power source from among multiple power sources.

BACKGROUND OF THE INVENTION

Several standards are extant for system level design of electronic devices, such as personal computers, which are intended to have multiple peripheral devices attached. In some system designs, the computer supplies power not only to its own components but also to peripherals that may be attached to its various expansion slots and busses. In other systems, peripherals are attached that supply their own power. In still other systems, the computer might supply power to itself and to certain peripheral, while other peripherals supply their own power.

Two well known standards for personal computer expansion busses, also known as peripheral busses, are the Universal Serial Bus (USB) and the IEEE Standard 1394. These standards are intended to be flexible to allow for any of the system power designs discussed above. Care must be taken in the design of such flexible systems to assure that a power supply is not overloaded because of excessive power consumption by the various electronic components (such as the computer itself and the peripherals), or that a conflict does not arise between two power supplies attempting to both supply power competitively, or that potentially damaging reverse current flow does not result from a large peripheral power supply driving the computer itself or over-driving other components attached to the bus.

Figure 1A:
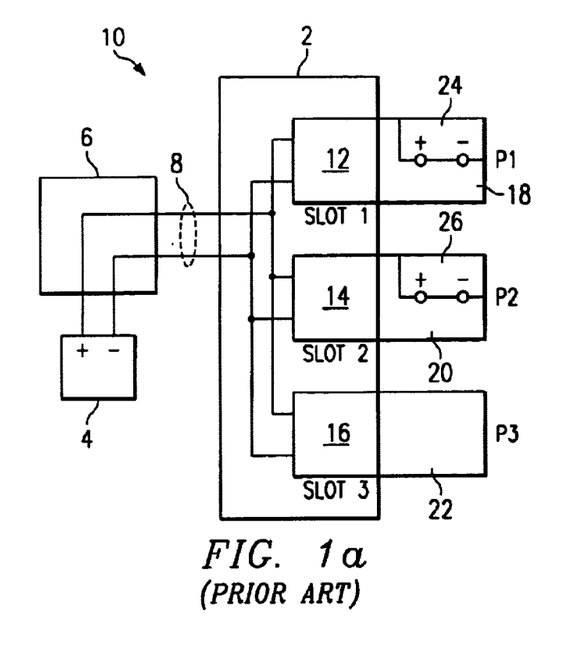
FIGS. 1a and 1b illustrate a prior art power management solution.
Figure 1B:
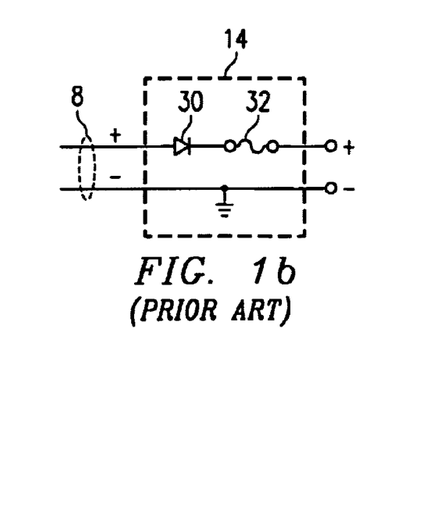

FIGS. 1a and 1b illustrate a typical prior art computer system 10 containing an expansion board 2 which provides for a flexible approach to power distribution and management. The system 10 includes a power supply 4 which provides power to mother board 6. System 10 may be an IBM-compatible personal computer, such as is well known in the art. Many components of system 10, including I/O devices such as keyboard and display, logic and control circuitry, microprocessor, graphics boards, cooling fans, and the like are not essential to an understanding of the present invention and hence are not illustrated for clarity. Mother board 6 receives power from power supply 4, which can take the form of a battery, or a regulated ac power supply, as is well known in the art. Expansion board 2 also receives power from power supply 4 by way of mother board 6 and power bus 8. Alternatively, expansion board 2 could receive power directly from power supply 4 by way of its own dedicated power bus.

As illustrated, expansion board 2 contains three slots, 12, 14, and 16, respectively, each of which provides an electrical interface for a peripheral device, such as peripherals 18, 20 and 22. As shown, each peripheral 18, 20, and 22 is coupled to power bus 8 by way of its respective slot 12, 14, and 16. In this way, power for the peripherals can be supplied by power supply 4, typically under the control and regulation of circuitry contained on mother board 6 and/or expansion board 2.

Note that peripheral 18 contains its own power supply 24 and that peripheral 20 contains its own power supply 26, whereas peripheral 22 does not contain its own power supply. As discussed above, a flexible system design standard will allow for any other of the three peripherals 18, 20, 22 to be supplied either by its own power supply (e.g., 24 and 26), or by the system power supply (i.e. power supply 4), or by the power supply of one of the other power supplies connected to the expansion board. For instance, peripheral 22 could be supplied from system power supply 4 or, if peripheral 20 has a power supply 26 that is at a higher voltage level than that provided by power supply 4, then power supply 26 could provide the power to peripheral 22 as well as to peripheral 20.

FIG. 1b illustrates further details for a typical prior art circuit interface slot 14. Slots 12 and 16 would also be similarly configured. Slot 14 includes a diode 30 and a fuse 32. Diode 30 is a unidirectional current flow device, meaning the device allows current to flow from the computer system to the peripheral (such as peripheral 20 of FIG. 1a) attached to slot 14, but does not allow reverse current to flow from the peripheral back to the computer system. Fuse 32 protects power supply 4 from an over-drive situation that could occur if, for instance, if the slot was accidentally grounded.

Several shortcomings exist with the prior art. For instance, diode 30 introduces a voltage drop across the circuit, thus lessening the power available to the attached peripheral. Likewise, fuse 32 introduces its own IR voltage drop across it. Also, as is known in the art, fuse 32 is typically a re-settable thermal fuse. Such thermal fuses have a very low on-state impedance and have a higher off-state impedance. This off-state impedance is not an open, however, and hence current flow and heat generation will still occur, even during the fuses thermal shut-down state. Also, such fuses tend to have varying characteristics from fuse to fuse (such as off temperature, off-state impedance, and the like), making circuit design difficult. Another shortcoming of prior art power management circuits is the large foot print occupied by the diode and fuse, taking up valuable board space.

Therefore, a need exists in the prior art for a power management circuit that overcomes the above discussed shortcomings in a small, inexpensive solution.

SUMMARY OF THE INVENTION

In one aspect, the present invention provides a power distribution circuit comprising a unidirectional switch having an input coupled to a first power supply and an output coupled to a first node of a bi-directional switch. The bi-directional switch has its second node coupled to a second power supply. The circuit also includes first control logic coupled to said uni-directional switch and allowing said uni-directional switch to conduct when said uni-directional switch is forward biased and preventing said uni-directional switch from conducting when said uni-directional switch is reverse biased. The circuit further includes second control logic coupled to said at least one bi-directional switch, said second control logic switching said at least one bi-directional switch to a non-conducting state when an over-current condition is detected.

In another aspect, the invention provides a computer system comprising at least one input/output device, a system power supply, a system power bus, and a mother board coupled to the power supply by said system power bus and receiving power therefrom. The computer system also includes an expansion board coupled to the power supply and to the mother board, a first peripheral connected to the expansion board, wherein the first peripheral comprises a peripheral power supply and peripheral circuitry and a power distribution circuit having an input coupled to said system power supply and an first output coupled to said peripheral power supply. The power distribution circuit comprises an active diode coupled between the input and a first re-settable fuse circuit, the first re-settable fuse being coupled to the first output.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 2:
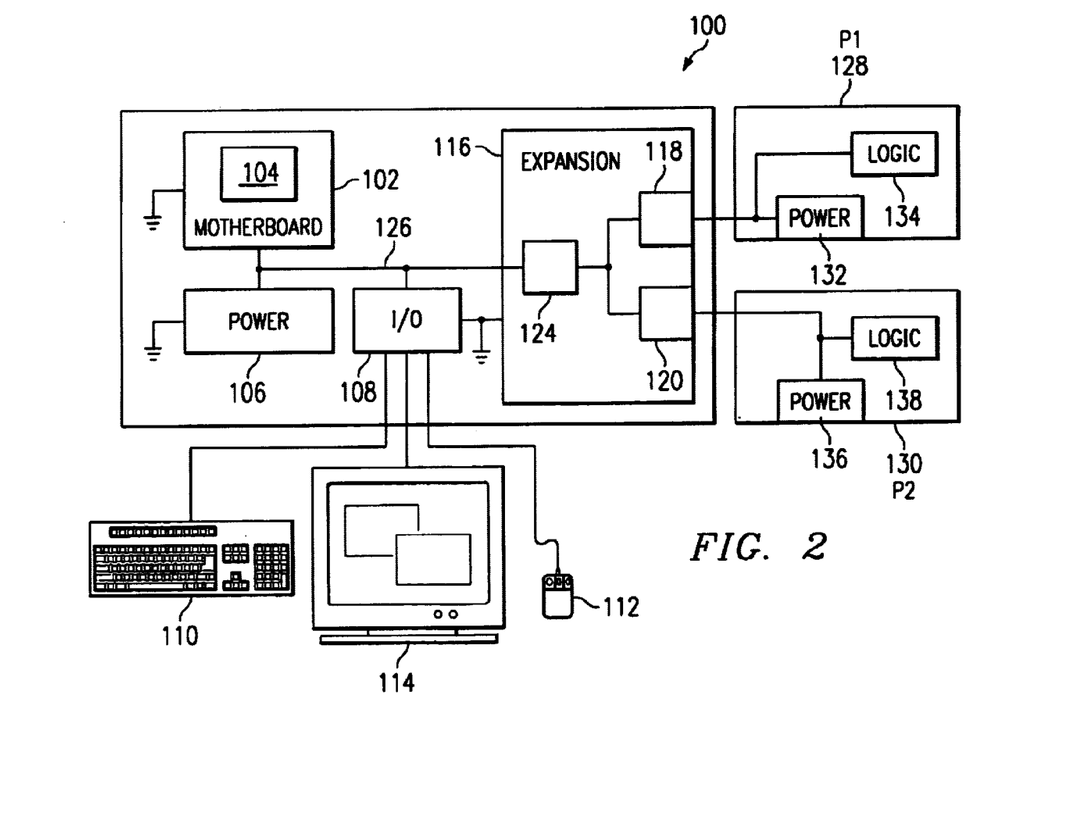
FIG. 2 is illustrates a computer system in which preferred embodiments of the present invention may be incorporated.

FIG. 2 illustrates an exemplary expandable electronic system, in this case a personal computer 100. The system includes various well known components of a typical personal computer, only a few of which are shown for clarity, including a motherboard 102, which contains a microprocessor 104, a regulated power supply 106, input/output circuitry 108, which controls various input/output devices such as a keyboard 110, a mouse 112, and a display device 114. Details of these system components are well known to those skilled in the art and are not necessary for an understanding of the present invention. Also included in the system 100 is an expansion board 116. Expansion board 116 provides expansion slots 118 and 120 to which devices may be attached, as is well known in the art. In the preferred embodiment, expansion board 116 is compatible with IEEE Standard 1394 ("IEEE Standard for a High Performance Serial Bus"). The 1394 specification, which is incorporated herein by reference, is available from IEEE, 345 East 47$^{th}$ Street, New York, N.Y. 10017-2394. The teachings apply, however, to other personal compute standards, such as Universal Serial Bus (USB) or to any electronic system wherein an integrated power management solution is desired.

Although only two expansion slots are shown for clarity, the teachings of the present invention are applicable to three, four or more expansion slots. For most systems, the number of expansion slots will be a design choice constrained by physical size and cost constraints and the ability to manage heat produced by the peripherals.

Expansion board 116 includes a power management circuit 124, which is connected to system power bus 126. For clarity, the power bus 126 will be illustrated as single line carrying the power supply voltage. The ground line, which may be either an absolute ground or a system ground is illustrated by the ground points for the various components 102, 106, 116, etc. Power management circuit 124 receives incoming power on bus 126 and connects the power supply 106 to expansion slot 118 and also to peripheral 120.

Peripheral 128 is shown connected to expansion slot 118 and peripheral 130 is shown connected to expansion slot 120. The peripheral device may be physically plugged into the slot, or more preferably, the peripheral includes a cable which is plugged into the slot and which connects to the peripheral device, which is contained outside the box housing the computer components. Examples of peripheral devices include hard disk drives, CCD cameras, camcorders, printers, scanners and the like.

Peripheral 128 contains its own power supply 132 and electronic circuitry 134. The electronic circuitry 134 will be supplied by either peripheral power supply 132 or by the system power supply 106, whichever supplies power at the higher level. Likewise, peripheral device 130 contains its own power supply 136 and its electronic components will be supplied by either peripheral power supply 136 or by system power supply 106, whichever supplies power at a higher level. In other embodiments, one or more of the peripherals might not have its own power supply and will derive its power from some other source, such as system power supply 106, or the power supply of another peripheral connected to expansion board 116.

Under the 1394 standard, the system must be flexible enough to allow for power to be supplied to all peripherals connected to expansion board 116 by any power supply connected to the board. This means that peripheral 130 may be supplied by its own power supply 136 (if it has one), or by power supply 132 of peripheral 128, or by system power supply 106, whichever supplies power at the highest level (i.e. greatest voltage).

As an example, assume system power supply 106 is providing power at 12 volts, that peripheral power supply 132 is supplying power at 5 volts, and that peripheral power supply 136 is supplying power at 11.5 volts. The 1394 Standard requires that the system allow for power to be supplied by system power supply 106. On the other hand, assume that system power supply 106 is at 12 volts, peripheral power supply 132 is at 5 volts, and peripheral power supply 136 is at 13 volts. In this case, the standard directs that peripheral power supply 136 supply power to both peripheral 130 and peripheral 128. Note that appropriate voltage regulation may be required on the peripherals themselves. This adaptive power distribution is provided for by power management circuit 124.

Figure 3:
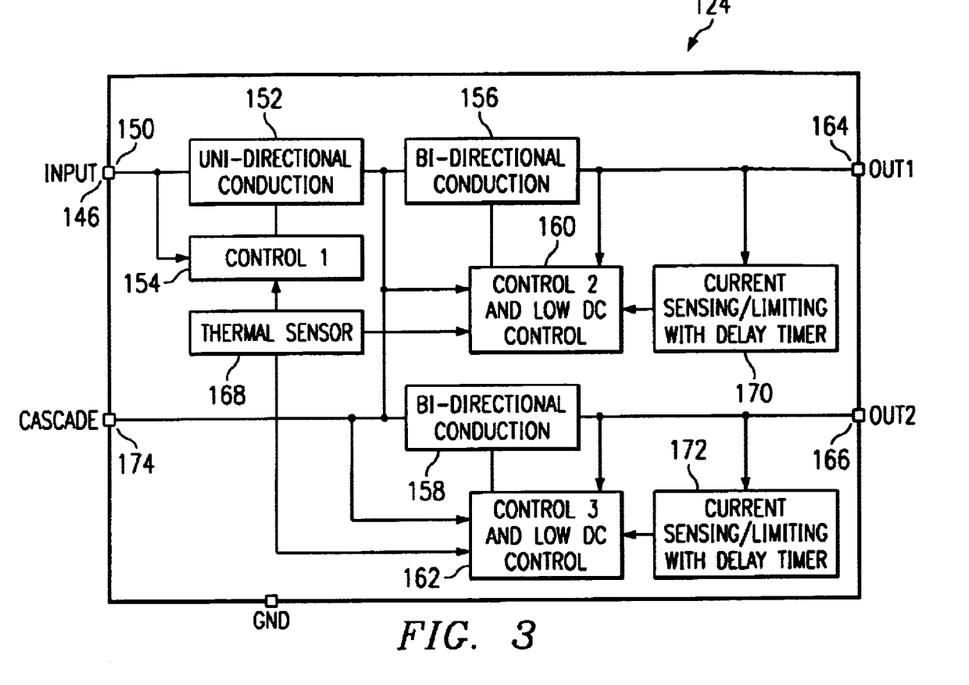
FIG. 3 is a schematic diagram of a preferred integrated circuit embodiment of the invention.

FIG. 3 provides additional details for power management circuit 124. Power supply line 146 is input to circuit 124 at INPUT node 150 and is fed to uni-directional switch 152 and also to control circuit ("Control1") 154. Uni-directional switch 152 operates under the control of Control1 circuit 154 and allows current to flow through uni-directional switch 152 to bi-directional switch 156 and also to bi-directional switch 158. Current also flows to Control2 logic 160 and to Control3 logic 162. Control2 logic 160 controls the operation of bi-directional switch 156 which allows either current to flow out to OUT1 node 164 or allows current to flow from OUT1 node 164 back into power management circuit 124. Likewise, bi-directional switch 158 operates under the control of Control3 logic 162 to allow current to flow through bi-directional switch 158 in either direction to or from OUT2 node 166. Power management circuit 124 also includes a thermal sensor 168 that senses thermal conditions, such as over-heating arising from excessive current flow and that passes an appropriate signal to Control2 circuit 160 and Control3 circuit 162. In the event that an over-heating condition is detected by thermal sensor 166, one or both of bi-directional switches 156 and 158 may be set to an open, i.e. non-conducting, state by control logic 160 or 162, respectively.

Likewise, current sensing circuit 170 and current sensing circuit 172 senses the current flowing through bi-directional switches 156 and 158, respectively, and provides feedback signals to Control2 logic 160 and Control3 logic 162, respectively.

OUT1 node 164 forms a part of expansion slot 118 (FIG. 2) and Out2 node 166 forms a part of expansion slot 120 and each preferably forms the Power pin for the respective slots. Peripherals 128 and 130 will have Power pins on their respective connectors that engage with the Power pins of the expansion slots as is well known in the art. OUT1 node 164 is coupled to the system power supply 106 (via power bus 126, uni-directional switch 152 and bi-directional switch 156) and also to peripheral power supply 132 via expansion slot 118. Additionally, as shown in FIG. 3, OUT1 node 164 is also coupled to peripheral power supply 136 via expansion slot 120 and bi-directional switches 158 and 156. Likewise, OUT2 node 166 is coupled to all three power supplies as well (i.e. system power supply 106 via power bus 126, uni-directional switch 152 and bi-directional switch 158; peripheral power supply 136 via expansion slot 120; and peripheral power supply 132 via expansion slot 118, and bi-directional switches 156 and 158). In this way, the electronic circuitry 134, 138 of peripherals 128, 130, respectively, will be supplied by whichever power supply 106, 132, 136 is at the highest operating voltage level.

Power management circuit 124 also contains a CASCADE node 174, which allows for several power management circuits 124 to be cascaded together in the event that more than two expansion slots are contained on expansion board 116. Alternatively, additional bi-directional switches and additional OUT nodes could be incorporated directly into power management circuit 124 to allow for additional expansion slots.

In operation, current flowing into power management circuit 124 will flow via INPUT node 146 through uni-directional switch 152 and bi-directional switch 156, if peripheral power supply 132 (and hence OUT1 node 164) is at a lower voltage than system power supply 106 (and hence INPUT node 146). If peripheral power supply 132 is at a higher voltage than system power supply 106, then current may flow back through bi-directional switch 156, but will be prevented from flowing back to the other computer system components (such as motherboard 102, I/O circuits 108) by uni-directional switch 152. Note that because bi-directional switch 156 does allow for reverse current, current can flow from peripheral power supply 132 to the peripheral circuitry 138 of the other peripheral device 130 (assuming that peripheral power supply 136 of the other peripheral 130 is at a lower voltage than peripheral power supply 132 of the first peripheral 128). Conversely, if the second peripheral's power supply 136 is at a higher voltage, than current will flow through bi-directional switches 158 and 156 to feed the circuitry of the first peripheral 128, but will not be passed back to the system components because of uni-directional switch 152. In this way, either the system power supply or any of the peripheral power supplies can provide power to the various components connected to expansion board 116, but the main system components are, in effect, isolated from the peripheral power supplies.

Figure 4:
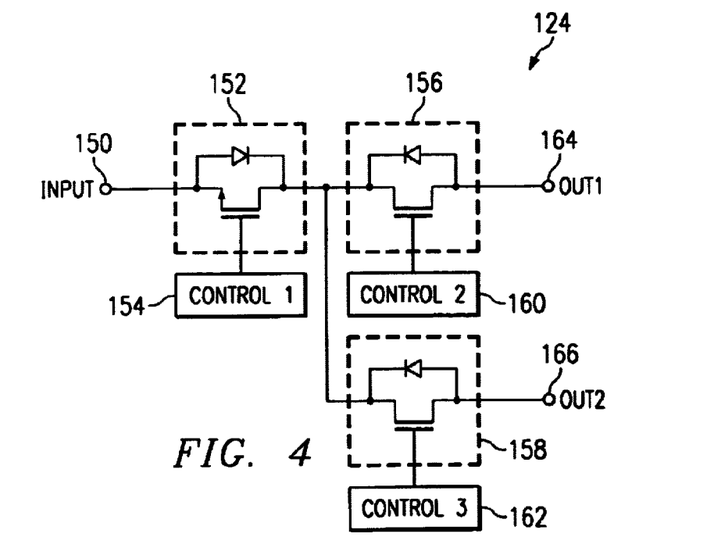
FIG. 4 illustrates a preferred embodiment power distribution circuit.

FIG. 4 schematically illustrates select portions of power management circuit 124. Specifically, uni-directional switch 152 is preferably a high power FET with its source connected to INPUT node 146, its gate connected to Control circuit 154, and its drain connected to bi-directional switches 156 and 158. As shown, bi-directional switches are also preferably power FETs, with their respective drains connected to Out1 and Out2, and their respective gates connected to Control2 160 and Control3 162, respectively. In the preferred embodiments, the FETs are N-channel devices constructed using standard DMOS processing. Other structures could be used as well, provided that the IR drop is sufficiently small and the $I^2R$ power generated by current flowing through the devices are contained within the package's power dissipation capability. The diodes shown connected across the source and drain are artifacts of the manufacturing process. Alternatively, PMOS devices could be used as well, and although they are not as area-efficient as NMOS, the gate drive circuitry is simplified, as will be apparent to one skilled in the art. In a lower-voltage application, use of PMOS devices may be preferable for this reason. Whether the FETs conduct or not is controlled by the gate voltage which is controlled by the respective control logic circuits 154, 160, and 162. For clarity, uni-directional switch 152 will at time be described simply as uni-directional FET 152 in the following discussions. Likewise, bi-directional switches 156 and 158 may be simply described as bi-directional FETs 156 and 158, respectively, in the following discussion. Throughout the following discussion, therefor, the term turning on FET 152 or 156 or 158 is synonymous with closing the switch and turning off the FET is synonymous with opening the switch.

Control1 circuit 154 senses when the voltage at the source of uni-directional FET 152 is higher than the voltage at the drain, indicating that the voltage at INPUT node 150 is higher than at the outputs Out1 and Out2. This indicates that current should flow from the system power supply 106 to the peripherals. Under these circumstances, Control1 circuit 154 will turn the FET 152 on by biasing the gate voltage high (or, alternatively, low if using PMOS switches). When the INPUT 150 voltage is lower than the Out1 or Out2 voltage, however, current will start to flow in the reverse direction through uni-directional FET 152. Control1 logic 154 senses this reverse current flow and opens FET 152 by biasing the gate voltage low.

Figure 5:
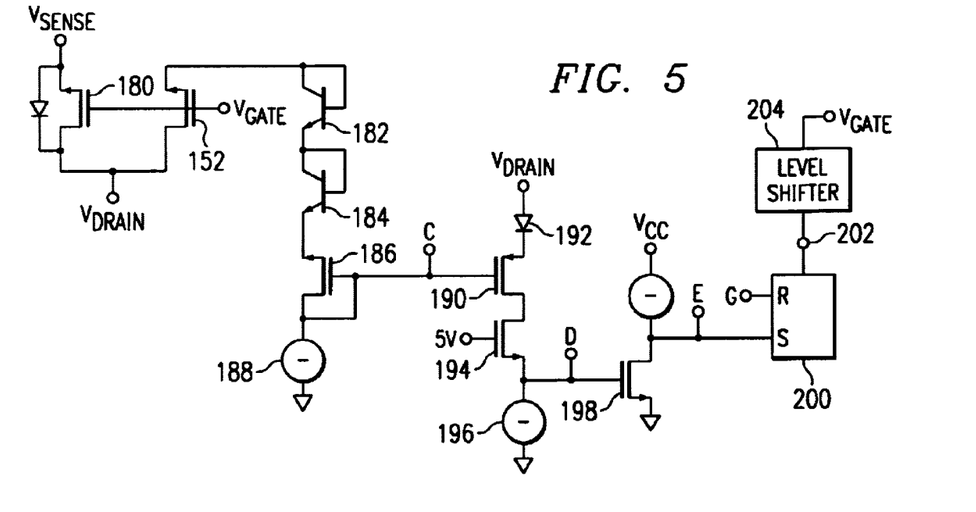
FIG. 5 illustrates a preferred embodiment voltage detector.

Further details of Control1 logic circuit 154 and its control of FET 152 will now be provided with reference to FIG. 5. The operation for detecting a forward voltage across uni-directional switch 152 (i.e. across the source to drain voltage) is discussed first. Uni-direction FET 152 is shown with a sense FET 180 connected across it in a common gate, common drain configuration. Sense FET 180 is used to detect reverse current flow through FET 152 as will be explained in greater detail below. The source of uni-directional FET 152 is connected to a first transistor 182 having its base and collector tied together, which in turn is connected in series to a second transistor 184 having its base and collector tied together. Second transistor 184 has its emitter tied to the source of n-channel transistor 186, the drain of which is connected to a current source 188. The gate of n-channel transistor 186 is connected to the gate of a p-channel transistor 190, the source of which is coupled to the drain of uni-directional FET 152 via diode 192.

When the source voltage of uni-directional FET 152 exceeds the drain voltage, by a sufficient threshold amount, p-channel transistor 190 is turned off. The amount of the threshold is determined by the characteristics of transistors 182 and 184 (i.e. the voltage drop across them) and also somewhat by the voltage drop across diode 192. In alternate embodiments, transistors 182 and 184 can be replaced with resistors, having IR characteristics sufficient to cause the desired turn-on voltage threshold to bias node C sufficiently to turn transistor 190 off. In the preferred embodiments, p-channel transistor 190 will turn off when the source to drain voltage across uni-directional switch 152 exceeds approximately a threshold voltage. There is a loop of devices which includes the DMOS diode (152), diode 192, Vgs of 190, Vgs of 186, and diodes 182 and 184. The voltages around this loop must equal zero when summed, so the Vgs terms cancel, as do the drops across devices 184 and 192. Then the defining relationship is between the current densities in 182 and the big power DMOS diode. The threshold will be deltaVbe=Vt ln (Area 152\*I182/Area 182\*I152). While processing variations allow this threshold to vary, it is preferably around 100 mV. If the diode 182 is constructed in such a way that it uses the same PN junctions as the power device, the threshold could be more accurately predicted, although it will be proportional to temperature. Since this relationship is related to current density, the threshold current can more accurately predicted than the threshold voltage. In alternative embodiments, Controll logic 154 senses this threshold current.

The effect of p-channel transistor 190 turning off is that no current will flow through source follower 194, thus node E will be brought to a logical LOW voltage level by current source 196. This causes n-channel transistor 198 to turn off, thus driving node E high. Node E is connected to the "set" input of RS latch 200. The output 202 of RS latch 200 will thus be latched to a logical high state. This logical high signal is passed to level shifter 204 where the logical high signal is level shifted relative to a virtual ground before being passed to the gate of uni-directional FET 152, thus turning the FET on and allowing the switch to pass current. Level shifter 204 allows for operation of control logic circuitry at a relatively low power consuming level compared to the operational levels of uni-directional FET 152. As will be apparent to one skilled in the art, it is preferable to maintain the gate voltage of FET 152 at a logical high or logical low level relative to the source voltage (which may be in the range of 12 volts in the preferred embodiment systems), rather than biasing the gate relative to absolute ground. Level shifter 204 allows for such operation and avoids excessive and possibly damaging gate to source voltage levels.

Figure 6:
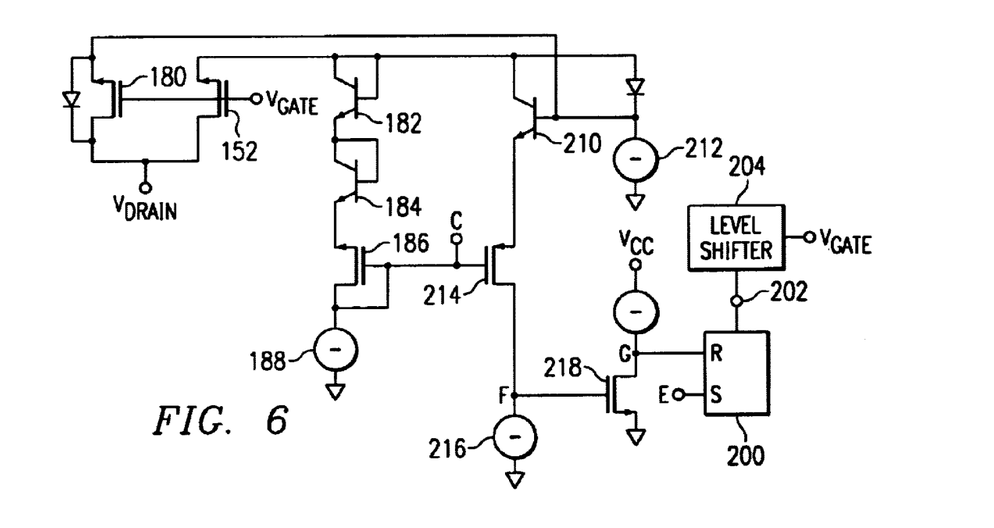
FIG. 6 illustrates a preferred embodiment reverse current detector.

Operation of Controll circuitry 154 in sensing reverse current flow through uni-directional FET 152 and in shutting off the FET will now be described with reference to FIG. 6. This reverse current flow will occur, for instance, in the event that the peripheral power supply on one of the expansion slots is greater than the system power supply 106. Many of the elements illustrated in FIG. 6 are common to FIG. 5 and are given the same reference numerals for clarity.

When reverse current flows through uni-directional FET 152, a proportionately lower reverse current also flows through sense FET 180. This current provides sufficient current to turn on NPN transistor 210, which is normally held in the off state by current source 212. (Note that the following discussion applies to elements that are different than the elements discussed with reference to FIG. 5). When transistor 210 turns on, current can flow through FET 214, allowing node F, which is otherwise held low by current source 216 to raise to a high level.

Inverter transistor 218 inverts the high signal at node F to a low on node G. The low level at node G is fed to the reset input of RS latch 200. In response, output 202 of RS latch 200 is latched to its low state. This low state is input to level shifter 204, resulting in a low voltage applied to the gate of uni-directional FET 152, thus turning the FET off. In this way, as soon as reverse current is detected, uni-directional FET 152 is turned off, under the control of Controll logic 154. As the above description makes clear, uni-directional FET 152, under control of Control 1 logic 154 preferably operates essentially as an active diode, allowing current flow to flow through the FET in a forward direction only with minimal IR drop and not allowing the current to flow through the effect in the reverse direction.

Details regarding the control and operation of bi-directional switches 156, 158 will now be discussed with reference to FIG. 7a. As discussed above, bi-directional switches 156, 158 allow current to flow in either direction, but need to be able to quickly shut off in order to limit current flow in instances of excessive current flow. This is in order to prevent damage to the device, or the other electronic components in the system. Additionally, the bi-directional switches must be able to react quickly when highly capacitive loads are hot switched into the expansion slot. The insertion of such a capacitive load will cause a sudden spike in current flow as the capacitive load is charged up. In prior art systems, the circuitry is not quick enough to limit the current spike, resulting in the system power supply being brought below its regulated output level. This often results in the system entering a fault condition, and in the case of a personal computer, causing an undesired re-boot. The preferred embodiments of the present invention overcome that shortcoming of the prior art by rapidly detecting over-current conditions and turning off the appropriate bi-directional switch in response.

Figure 7A:
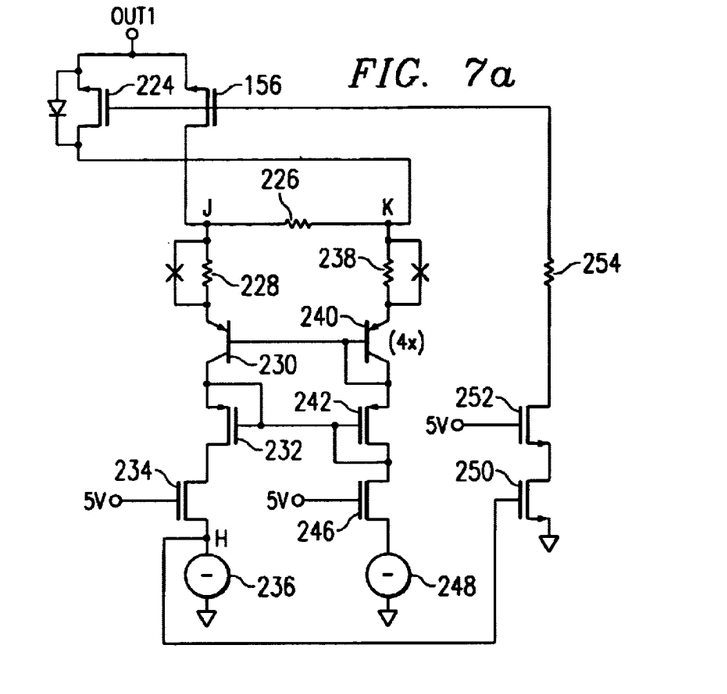
FIGS. 7a and 7b illustrate alternative preferred embodiment over-current detectors.

As shown in FIG. 7a, bi-directional switch FET 156 has associated with it a sense FET 224 configured in a common source, common drain configuration. As will be apparent to one skilled in the art, sense FET 224 is considerably smaller than bi-directional switch FET 156, preferably in the range of 500 to 1,000 times smaller. As such, current flowing through bi-directional FET 156 will be 500 to 1,000 times greater than the current flowing through sense FET 224. The drains of the two FETs are connected to the two nodes, J and K, of current sensing resistor 226, thus causing a voltage drop across resistor 226 that is proportionate to the current flow through bi-directional FET 156. Current sensing resistor 226 is connected at its node J to a second resistor 228, which is in turn connected to transistor 230, thence FET 232, thence source follower 234, and finally current source 236. Node K of current sensing resistor 226 is similarly connected to a third resistor 238, transistor 240, FET 242, source follower 246 and current source 248.

Transistor 240 is preferably four times the size of transistor 230. Therefore, the voltage across current sensing resistor 226 necessary to turn on transistor 230 is given by the equation: $V_T$*ln (ratio). In this case, the ratio between transistor 240 and 230 is 4 and the threshold voltage $V_T$ is preferably 26 mV. The voltage across current sensing resistor 226 necessary to turn on transistor 230 is therefore 36 mV (from the above equation). Current sensing resistor 226 is preferably a 13 ohm resistor, meaning the current through current sensing resistor 226 required for a 36 mV drop is approximately 3 mA. Assume that the ratio of bi-directional FET 156 and sense FET 224 is 1,000. Therefore, a 3 mA current flow through sense FET 224, and hence through current sensing resistor 226 is indicative of a 3 A current flow through bi-directional FET 156. It is desirable to turn FET 156 off when 3 amps or more are flowing through it. This is accomplished as follows.

When transistor 230 turns on as a result of the voltage drop across current sensing resistor 226, node H is pulled high. This in turn turns on FET 250, which is normally in the Off state. When FET 250 is turned on, the gate of bi-directional FET 156 is pulled low, via source follower 252 and resistor 254, thus turning off bi-directional FET 156 and shutting the excessive current flow. One skilled in the art will recognize that various modifications and design choices can be made to alter the cut off current, such as by changing the radio of sense FET 224 to bi-directional FET 156, changing the value of current sensing resistor 226, changing the ratio between transistors 230 and 240, and the like. As the above description makes clear, bi-directional switches 156 and 158, under control of Control2 160 and Control3 162, respectively, preferably operate essentially as re-settable fuses that provide a quickly responsive current limiting function when excessive current is detected.

Figure 7B:
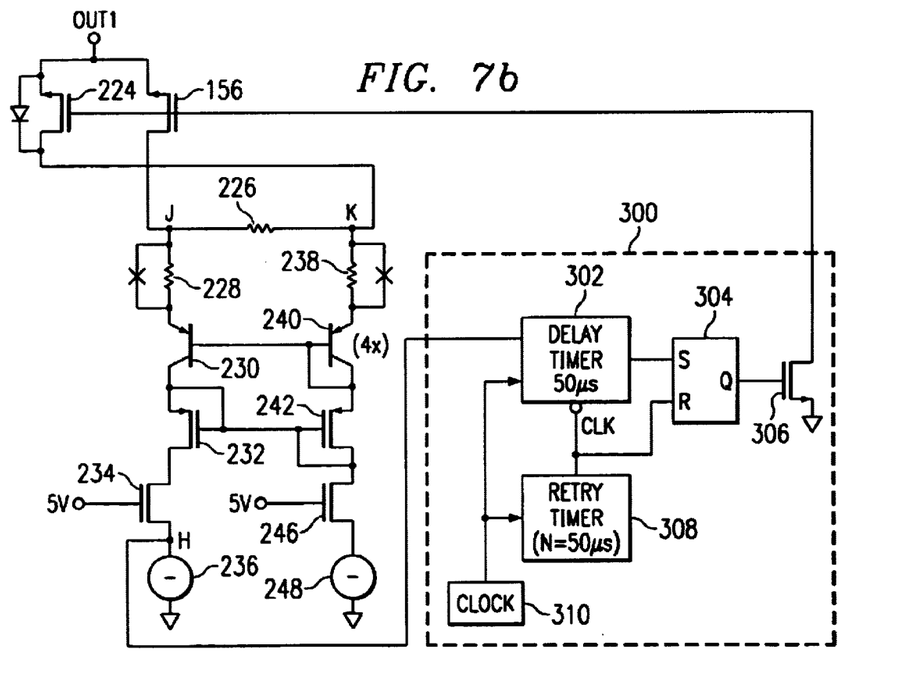

In an alternative embodiment, Control2 160 and Control3 162 are configured to limit current by putting bi-directional switches 156 and 158, respectively in a chopped mode. In chopped mode, the switches are allowed essentially placed in a duty cycle mode whereby large current flows are allowed for only a portion of the time. In this way, large transient currents (such as arising from a highly capacitive load being placed on the outputs) can be accommodated without generating excessive heat.

FIG. 7b illustrates this alternative embodiment. Note that in FIG. 7b, transistors 250 and 252, and resistor 254 of FIG. 7a have been replaced with current chopping circuit 300. In yet other embodiments, both the circuit illustrated in FIG. 7a and the circuit illustrated in FIG. 7b could be employed, with an appropriate hardware or software switch employed to enable the operation of the desired circuitry.

Referring to FIG. 7b, the operation of current chopping circuit 300 will be described in further detail. The signal at node H is input to delay timer 302 and enables the delay timer 302, allowing an overcurrent condition to occur for a brief period of time (preferably 50 us to 100 us). After the delay, delay timer 302 outputs a signal to RS latch 304, which passes a control signal via transistor 306 to bi-directional FET 156. The control signal turns the FET off (i.e. non-conducting). After another delay generated by retry timer 308 (of preferably a multiple of the delay timer period, preferably at least ten to twenty times the period), a signal is sent from retry timer 308 to the reset input of RS latch 304, thus causing the output of RS latch to pass a control signal via transistor 306 to bi-directional FET 156 and placing the FET in its on state (conducting). Both delay timer 302 and retry timer 304 receive timing signals from clock circuit 310. The cycle will repeat until the fault condition is removed. It should be noted that a circuit CAN be implemented to have both an over-current "control" (as shown and described in FIG. 7a) and a "chopped" mode. In this type of application, the current will be limited to a controlled level, during the time that the "chopping" mode allows the output device to be activated. In yet another embodiment, both current limiting and current chopping can be simultaneously employed, with the current passing through bi-directional FET 156 being limited while in its on state, and the FET being periodically set to its off state as described above.

Figure 8:
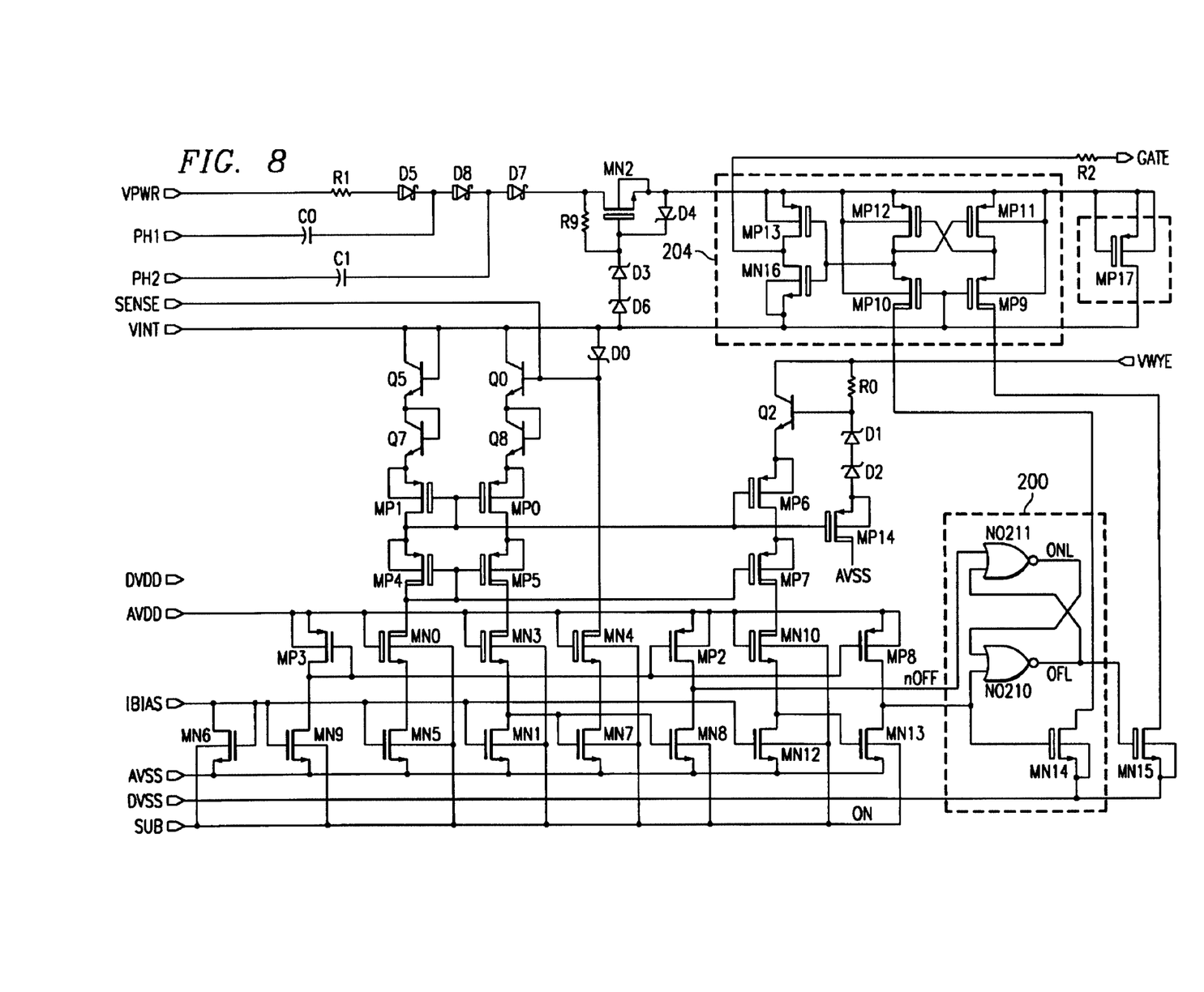
FIG. 8 schematically illustrates further details of the preferred embodiment voltage and reverse current detector.
Figure 9:
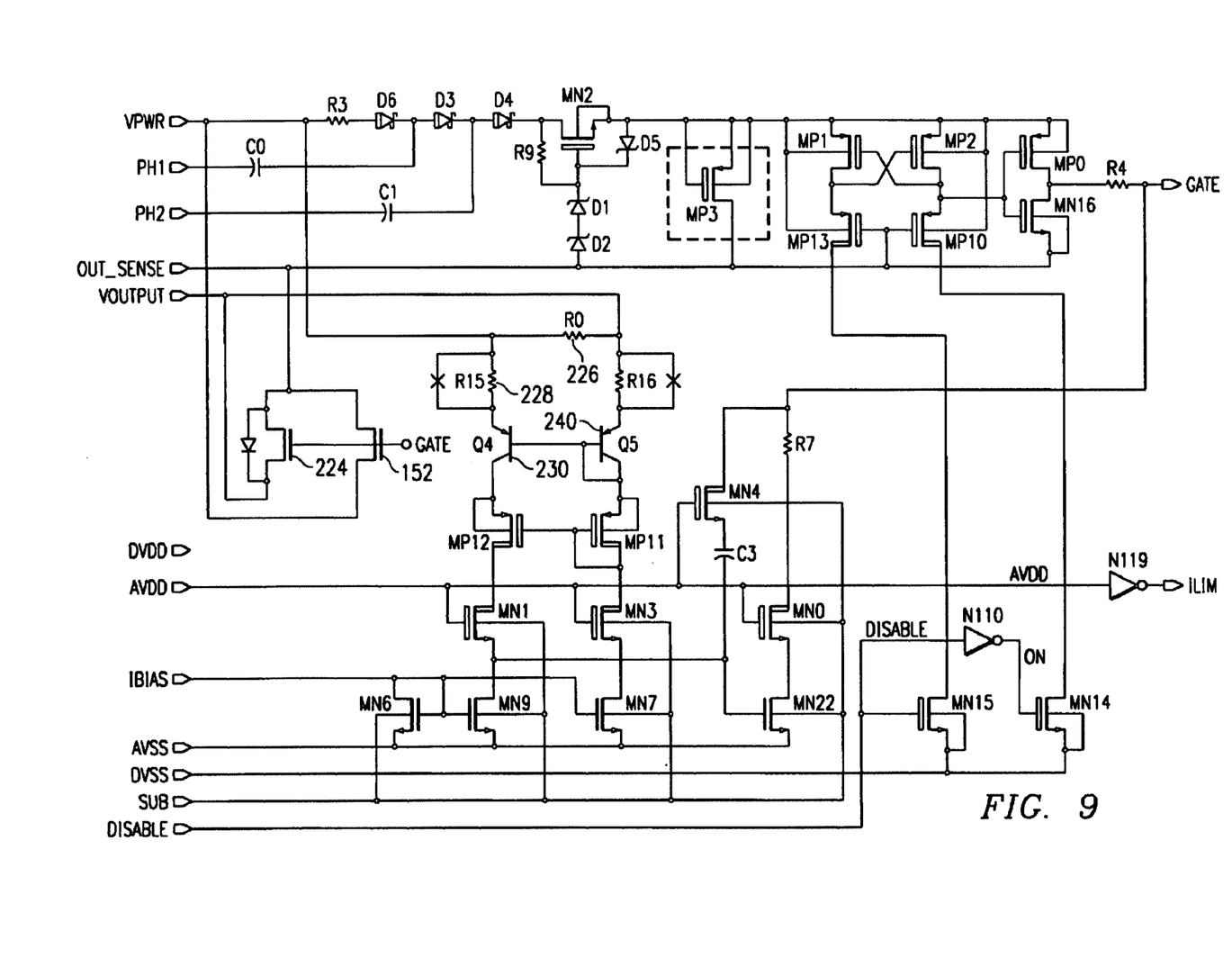
FIG. 9 schematically illustrates further details of the preferred embodiment over-current detector.

FIG. 8 illustrates in still further detail a preferred embodiment circuit or uni-directional switch 152 and Controll circuitry 154, including details regarding RS latch 200 and level shifter 204. FIG. 9 illustrates in still further detail a preferred embodiment for bi-directional switch 156 and/or 158 and Control2 circuitry 160 and/or Control3 circuitry 162. One skilled in the art will recognize that many modifications and design choices can be applied to the illustrated embodiments and still stay within the scope of the inventive concepts.

In the preferred embodiments, the invention is realized as an integrated circuit formed on a single silicon substrate. Preferably, the various electronic components described above are formed a BiCMOS Power process with bipolar, power NMOS transistors, and CMOS for low-voltage linear and logic. Other processes such as bipolar, CMOS, NMOS, will be apparent to one skilled in the art, with the primary constraints being power handling capabilities, cost, and size. One skilled in the art will also recognize that the circuits could also be embodied using discrete components and that some of the logic components described herein could be embodied in a general purpose or special purpose processor operating in accordance to pre-programmed instructions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For instance, while the preferred embodiment circuits and system are implemented in combination logic using CMOS fabrication processes, other fabrication processes are clearly contemplated. Additionally, the described functionality could be realized using a general purpose microprocessor or digital signal processor running instructions stored in memory. Various other modifications and embodiments will be apparent to one skilled in the art. It is therefore intended that the appended claims encompass any such modifications or embodiments.

What is claimed is:

1. A power distribution circuit comprising:

a uni-directional switch having an input coupled to a first power supply and an output coupled to a first node of at least one bi-directional switch;

the at least one bi-directional switch having its second node coupled to a second power supply;

first control logic coupled to said uni-directional switch and allowing said uni-directional switch to conduct when said uni-directional switch is forward biased and preventing said uni-directional switch from conducting when said uni-directional switch reverse biased;

second control logic coupled to said at least one bi-directional switch, said second control logic switching said at least one bi-directional switch to a non-conducting state when an over-current condition is detected.

2. The power distribution of claim 1 further comprising:
a second bi-directional switch having a first node coupled to said uni-directional switch and having a second node coupled to a third power supply.

3. The power distribution circuit of claim 2 further comprising:
third control logic coupled to said second bi-directional switch, said third control logic switching said at second bi-directional switch to a non-conducting state when an over-current condition is detected.

4. The power distribution circuit of claim 1 wherein said first control logic comprises:
a forward voltage detector coupled to said uni-directional switch; and
a reverse current detector coupled to said uni-directional switch.

5. The power distribution circuit of claim 4 wherein the uni-directional switch comprises a FET having a source, drain and gate, and wherein the forward voltage detector comprises:
a voltage comparator coupled between the source and drain; and
a switch having an input coupled to the voltage comparator and having an output coupled to a first input of a latch, the output of the latch being coupled to the gate.

6. The power distribution circuit of claim 4 wherein the uni-directional switch comprises a first FET having a source, drain, and gate, and further comprising a sense FET having a gate coupled to the gate of the first FET and having a drain coupled to the drain of the first FET and having a source, and wherein the reverse current detector comprises:
a first transistor having a base coupled to the source of the sense FET;
a second transistor having its source coupled to the emitter of the first transistor and having its gate coupled to the source of the first FET and having its drain coupled to a current source and to a gate of a third transistor;
the third transistor having its source connected to a second input of a latch; and
wherein the latch has an output coupled to the gate of the first FET.

7. The power distribution circuit of claim 1 wherein said uni-directional switch comprises a FET.

8. The power distribution circuit of claim 7 wherein said FET comprises a source coupled to said first power supply, a drain coupled to said at least one bi-directional switch, and a gate coupled to said first control logic.

9. The power distribution circuit of claim 1 wherein said uni-directional switch comprises a bipolar transistor.

10. The power distribution circuit of claim 1 wherein said first control logic comprises:
a forward current detector coupled to said uni-directional switch operative to place the uni-directional switch in a conductive state; and
a reverse current detector coupled to said uni-directional switch operative to place the uni-directional switch in a non-conductive state.

11. A computer system comprising:
at least one input/output device;
a system power supply;
a system power bus;
a mother board coupled to the power supply by said system power bus and receiving power therefrom;
an expansion board coupled to the power supply and to the mother board;
a first peripheral connected to the expansion board, wherein the first peripheral comprises a peripheral power supply and peripheral circuitry; and
a power distribution circuit having an input coupled to said system power supply and an first output coupled to said peripheral power supply, the power distribution circuit comprising:
an active diode coupled between the input and a first re-settable fuse circuit, the first re-settable fuse being coupled to the first output, wherein the active diode comprises:
a first transistor having a first node coupled to the input, a second node coupled to the re-settable fuse, and a control node; and
first control logic coupled to the control node, wherein the first control logic comprises:
a forward bias detector coupled to the control node and operative to turn the first transistor on when the first transistor is biased in a first direction; and
a reverse bias detector coupled to the control node and operative to turn the first transistor off when the first transistor is biased in a second direction, wherein the forward bias detector detects forward voltage and the reverse bias detector detects reverse current.

12. An integrated circuit comprising:
an input pin configured to be coupled to a system power supply;
at least one output pin configured to be coupled to a peripheral device;
a uni-directional switch having coupled between the input pin and at least one bi-directional switch;
the at least one bi-directional switch being coupled between the uni-directional switch and the at least one output pin;
control logic coupled to the uni-directional switch and the at least one bi-directional switch, operative to control the operation of the uni-directional switch and the at least one bi-directional switch; and
a thermal sensor circuit operative to detect a thermal overload condition and to generate a thermal overload signal in response thereto; and wherein the control logic, responsive to the thermal overload signal, is operative to shut off the uni-directional switch or the at least one bi-directional switch.

13. The integrated circuit of claim 12 further comprising:
a second output pin configured to be coupled to a second peripheral device; and
a second bi-directional switch coupled between the second output pin and the bi-directional switch, the second bi-directional switch also being coupled to the at least one bi-directional switch.

14. The integrated circuit of claim 12 further comprising a cascade pin whereby the integrated circuit can be connected to a second integrated circuit in a cascade configuration.

15. The integrated circuit of claim 12 wherein the uni-directional switch comprises a FET.

16. The integrated circuit of claim 12 wherein the at least one bi-directional switch comprises a FET.

17. The integrated circuit of claim 12 wherein the control logic further comprises a level shifter coupled between the control logic and the uni-directional switch.

18. A method of managing multiple power supplies in an electronic system, the system including a system power supply, a peripheral power supply, and a power manager coupled between the main and peripheral power supplies, the method comprising:

detecting when the main power supply is at a higher voltage than the peripheral power supply;

closing a first switch between the main power supply and the peripheral power supply in response to the first detecting step;

detecting when the main power supply is at a lower voltage than the peripheral power supply;

opening the first switch between the main power supply and the peripheral power supply in response to the second detecting step;

detecting when current flowing into or out of the peripheral power supply exceeds a threshold;

opening a second switch between the main power supply and the peripheral power supply, in response to the third detecting step.

19. The method of claim 18 further including detecting a thermal overload condition and opening either the first switch or the second switch or both in response the detecting the thermal overload condition.

* * * * *